United States Patent
Rebertus et al.

[15] 3,692,838
[45] Sept. 19, 1972

[54] PROCESS FOR PREPARING SALTS OF TRIS(DIFLUORAMINO)METHOXY ALKYL AMINES

[72] Inventors: Robert L. Rebertus, Mendota Heights; Richard P. Fields, St. Paul, both of Minn.

[73] Assignee: Minnesota Mining and Manufacturing Company, St. Paul, Minn.

[22] Filed: Jan. 19, 1965

[21] Appl. No.: 426,692

[52] U.S. Cl..........260/584 C, 260/501.17, 260/705, 260/707
[51] Int. Cl.............................................C07c 93/02
[58] Field of Search...260/583, 705, 584, 707, 567.6, 260/583 NH, 501.17

[56] References Cited

UNITED STATES PATENTS 2,945,061    7/1960    Habernickel..............260/551

OTHER PUBLICATIONS

Glasstone, Textbook of Physical Chemistry, 2nd Ed., D. Van Nostrand Co., Inc., New York, 1946, pp. 974 to 976 QD453G55

*Primary Examiner*—Leland A. Sebastian
*Attorney*—Frank A. Steldt, Donald C. Gipple and Temple Clayton

[57] ABSTRACT

1. A process for the preparation of salt or water-soluble and alkyl amine substituted 0 1,5 least one tris(difluoramino) methoxy group comprising the steps of
   I. distributing said amine from polar solvent into fluorinated solvent, and, thereafter,
   II. redistributing said amine into a further portion of polar solvent while incrementally adding said water-soluble acid in total at least equalling the stoichiometric amount.

5. A process according to Claim 1 wherein the amine is ω-[tris(difluoramino)methoxy]undecyl amine and the water-soluble acid is hydrochloric acid.

5 Claims, No Drawings

PROCESS FOR PREPARING SALTS OF TRIS(DIFLUORAMINO)METHOXY ALKYL AMINES

This invention relates to a process for the preparation of purified salts of ω-[tris(difluoramino)methoxy] alkyl amines and particularly the salts thereof with anions of water-soluble acids.

The purification of salts of ω-[tris(difluoramino)methoxy] alkyl amines is more difficult than most purifications because of the presence of the highly reactive difluoramino groups. Because of the oxidative capacity of the difluoramino substituted amines, many solvents and techniques of separation which might be used must be excluded if involving reducing systems or even in many instances conventional heating and cooling. Furthermore, purification procedures are made more difficult because the most probable or commonly encountered impurities are salts of chemically similar amines containing fewer or no difluoramino groups but with the same anion. Most of such salts possess solubilities, acidities and polarities comparable to those of the desired salts of tris(difluoramino) methoxyalkyl amines.

It is one object of this invention to provide a process for the preparation of salts of Bronsted acids and alkyl amines substituted by at least one tris(difluoramino) methoxy group.

It is an object of this invention to provide a method for the purification of amines containing one or more tris(difluoramino) methoxy groups.

It is another object of this invention to provide a method for the purification of salts of amines comprising one or more tris(difluoramino) methoxy groups.

A further object of this invention is to provide a process for obtaining purified 2-[tris(difluoramino)methoxy] ethyl ammonium perchlorate.

A still further object of this invention is to provide a method for obtaining purified ω-[tris(difluoramino)methoxy]undecyl ammonium chloride.

Other objects of the invention will become evident from the disclosure hereinafter.

In accordance with the above and other objects of the invention it has been found that tris(difluoramino)methoxy alkyl amines are not only soluble in polar solvents but are also soluble in inert fluorinated solvents such as perfluoroisooctane, perfluorotributylamine, 1,1,2-trichloro-1,2,2-trifluoroethane, perfluorinated 8-carbon cyclic ethers having the empirical formula $C_8F_{16}O$ and the like members of the group of perhalogenated solvents in which at least about one half the halogens are fluorine and the remainder are chlorine. It is also found that these amines can be distributed between the polar and fluorinated solvents but that contaminating and undesired amines are not thus distributed and lack solubility in the fluorinated solvents. Likewise salts of the desired tris(difluoramino)methoxyalkyl amines are virtually insoluble in fluorinated solvents. Advantage is taken of these distribution relationships for the preparation of purified salts of these amines in the process of the invention.

This combination of solubility in both inert fluorinated solvents and in polar solvents is not to be expected inasmuch as these amines contain no bonds from carbon to fluorine which might be expected to confer solubility in fluorinated solvents and, indeed, these compounds contain polar amine groups which might further prevent that solubility. An unexpected advantage of the process is that contamination of the purified product by autogenous decomposition products is minimized by the relative insolubility thereof in fluorinated solvents.

Basically the process of the invention contemplates taking up the amine in a fluorinated solvent, for example, by extraction from an aqueous solution in which it has been liberated by the addition of a mild alkali such as sodium bicarbonate, followed by precise neutralization with the desired acid in a polar solvent in which the desired salt is soluble.

The process is illustrated in greater detail by the following examples.

A total of 1.8 g. of crude 2-[tris(difluoramino)-methoxy]ethyl ammonium perchlorate of about 50 percent purity (from the fluorination of the reaction product of the perchlorate salt of ethanolamine and perfluoroguanidine) is dissolved in a total of 110 ml. of water, containing up to about 20 percent by volume of methanol, and the solution is divided into 11 aliquots. To a 10 ml. aliquot is added 0.2 g. of sodium bicarbonate, and the liberated free amine is extracted using a single 100 ml. portion of perfluorinated cyclic ether ($C_8F_{16}O$). The amine is then extracted from solution in the fluorinated solvent with a 10 ml. portion of about N/4 methanolic or aqueous hydrochloric acid (2 percent of concentrated aqueous acid by volume). The same mildly alkaline aliquot is again extracted using the same portion of fluorinated solvent which is reextracted using the same portion of methanolic hydrochloric acid. This operation is repeated a third time. The original aliquot is now exhausted and is discarded. The process is repeated on each of the other ten aliquots in turn employing the same portion of fluorinated solvent and a fresh portion of methanolic hydrochloric for each aliquot. The methanolic extracts, totalling about 110 ml., are pooled and evaporated to a solid residue. The residue is taken up in 50 ml. of water and 2.0 g. of sodium bicarbonate are added. The amine is again extracted using 500 ml. of the same fluorinated solvent. The solution of amine in fluorinated solvent is separated from the aqueous layer and combined with 50 ml. of fresh methanol. The amine is brought into the methanolic phase by titration to Methyl Yellow end point with 0.2 N methanolic perchloric acid. The fluorinated solvent is separated and reused to extract residual amine which is brought into the methanolic solution by addition of further methanolic perchloric acid as needed. 2-[Tris(difluoramino)-methoxy]-ethyl ammonium perchlorate is recovered as a crystalline solid melting at 218° C. by cautious evaporation of methanol. Recovery is about 90 percent.

Analysis:

Calculated for $C_3H_7ClF_6N_4O_5$: 11.0 percent C; 34.7 percent F; oxidizing power: 17.1 milliequivalents $I_2$/g; Equivalent weight (by titration with standard alkali): 329.

Found: 11.3 percent C; 33.6 percent F; oxidizing power: 16.6 meq.$I_2$/g. equivalent weight: 330.

In another preparation, 180 g. of 2-[tris(difluoramino)-methoxy]-ethyl ammonium perchlorate (of about 55 percent purity having oxidizing power of 9.4 meq.$I_2$/g.) dissolved in 3700 ml. of 17 volume percent methanol in water was purified by the above procedure in 14 aliquots. Each aliquot was neutralized with 30 g. of sodium bicarbonate and extracted five times with $C_8F_{16}O$. After each extraction, the amine in the fluorinated solvent was extracted into a single 300 ml. portion of methanol by titration as above with methanolic perchloric acid and the fluorinated solvent then reused for the next extraction. After the seventy extractions, evaporation of the methanolic extract gives crystalline 2-[tris(difluoramino)-methoxy]-ethyl ammonium perchlorate as above of about 94 percent purity.

Salts of other soluble Bronsted acids are prepared similarly by titrating with solutions of the acids in methanol or other suitable polar solvents in place of the methanolic perchloric acid solution employed in the above examples. In this way the omega-[tris(difluoramino)-methoxy] alkyl chlorides, nitrates, bromides, sulfates, oxalates, acetates, bifluorides, etc. are produced in purities above about 90 percent starting from relatively crude perchlorates. Likewise, as will be seen, one salt may be converted to another salt without the difficulties normally encountered in inorganic preparative methods of replacing one anion by another.

The following table sets forth data pertinent to the preparation of non-hygroscopic crystalline salts as described above and the properties thereof.

TABLE I

| Acid used | HBr | $HNO_3$ | $H_2SO_4$ | HCl | $H_2C_2O_4$ |
|---|---|---|---|---|---|
| Weight of crude tris (difluoroamino) methoxy ethyl ammonium perchlorate used (60% pure), mg | 190 | 152 | 161 | 205 | 162 |
| Normality of acid used | .1048 | .0993 | .1184 | .1015 | .0996 |
| Total acid volume, ml | 2.98 | 2.55 | 2.65 | 3.15 | 3.12 |
| Yield of new amine salt, percent | ~100 | 91 | 89 | 85 | ~100 |
| Melting point,* °C | 96 | 107 | 128 | 110 | 134 |
| Equivalent weight (H+): | | | | | |
| Calculated | 309 | 291 | 277 | 275 | 273 |
| Found | | 259 | 258 | 263 | |
| Oxidizing power (Meq. $I_2$/gram sample): | | | | | |
| Calculated | 18.1 | 19.3 | 20.2 | 21.2 | 20.5 |
| Found | 16.5 | 18.0 | 18.3 | 20.4 | 19.4 |
| Calculated purity, percent | 91 | 93.3 | 90.6 | 96.2 | 94.6 |
| Carbon, percent: | | | | | |
| Calculated | 11.7 | 12.4 | 13.0 | 13.6 | 17.6 |
| Found | 12.3 | 13.0 | 12.8 | 13.5 | 18.2 |
| Fluorine, percent: | | | | | |
| Calculated | 36.9 | 39.2 | 41.2 | 43.1 | 41.8 |
| Found | | 38.4 | | 42.4 | |

*Decomposition occurs below the apparent melting point. Data obtained at heating rate of 3 °C./min. Higher melting points are obtained by heating at faster rates.

The procedure is readily modified to operate as a continuous process and it is then found that co-current operation is advantageously employed because of the surface and interfacial tension characteristics and relative density of the fluorinated solvents.

In a further embodiment of our invention, in which the salt with one Bronsted acid is converted to the salt with a different Bronsted acid and is simultaneously purified a solution containing 90 mg. of crude ω-[tris(difluoramino)methoxy]-undecyl ammonium perchlorate (of 70 percent purity based on oxidizing power of 6.3 milliequivalents of iodine per gram) in 10 ml. of water, 4 ml. of methanol and 1 ml. of acetonitrile is twice successively extracted by cyclic ether $C_8F_{16}O$ after addition of 200 mg. of sodium bicarbonate and the free amine distributed from the perfluorinated solvent into methanol using 0.12 N aqueous hydrochloric acid as above. Exaporation of the methanol gives solid material characterized as ω-[tris(difluoramino)methoxy)-undecyl ammonium chloride by infrared absorption spectroscopy and analysis:

Calculated for $C_{12}H_{25}ClF_6N_4O$: oxidizing power, 10.5 meq./g.; 29.16 percent F.

Found: oxidizing power, 9.6 meq/g.; 27.2 percent F.

Substantially the same results are obtained when the above examples are repeated employing perfluoroisooctane (mixed isomers), 1,1,2-trichloro-1,2,2-trifluoroethane and perfluorotributylamine as extracting solvents.

What is claimed is:

1. A process for the preparation of salt of water-soluble acid and alkyl amine substituted by at least one tris(difluoramino)methoxy group comprising the steps of
   I. distributing said amine from polar solvent into fluorinated solvent, and, thereafter,
   II. redistributing said amine into a further portion of polar solvent while incrementally adding said water-soluble acid in total at least equalling the stoichiometric amount.

2. A process for the purification of salt of water-soluble and alkyl amine substituted by at least one tris(difluoramino) methoxy group comprising the steps of
   I. liberating said amine from said salt in polar solvent
   II. distributing said amine from said polar solvent into fluorinated solvent, and, thereafter,
   III. redistributing said amine into a further portion of polar solvent while incrementally adding said water-soluble acid in total at least equalling the stoichiometric amount necessary to achieve neutralization.

3. A process according to claim 1 wherein the amine is 2-[tris(difluoramino)methoxy]ethyl amine.

4. A process according to claim 3 wherein the water-soluble acid is perchloric acid.

5. A process according to claim 1 wherein the amine is ω-[tris(difluoramino)methoxy]undecyl amine and the water-soluble acid is hydrochloric acid.

* * * * *